United States Patent Office 2,795,753
Patented June 11, 1957

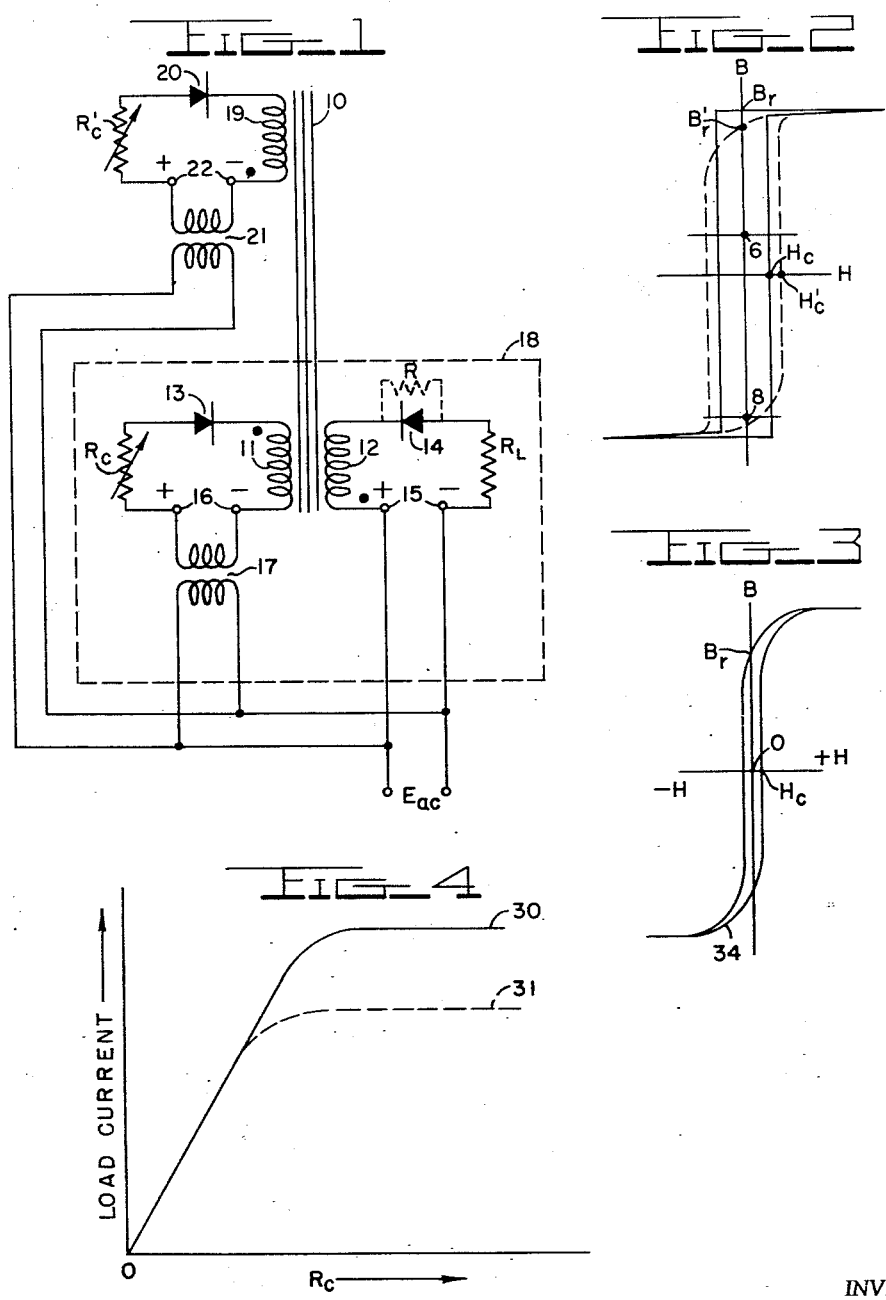

2,795,753

MAGNETIC CONTROLLER

Clarence B. House, Arlington, Va.

Application June 1, 1953, Serial No. 358,989

2 Claims. (Cl. 323—89)

(Granted under Title 35, U. S. Code (1952), sec. 266)

This invention relates generally to saturable core reactors and more particularly to high gain, high speed of response magnetic amplifier systems.

There has recently appeared in the field of magnetic amplifiers (volume 70, part II, pages 1214 to 1222 and pages 2124 to 2128 of the AIEE Transactions, and also in the copending application of R. A. Ramey, Serial No. 237,813, filed July 20, 1951) a novel reset amplifier which is based on the unique concept that the flux in the amplifier core is a function of the time-integral of voltage applied to the core winding. This amplifier depends in its operation on the use of core materials which exhibit high remanence properties, or so-called square loop hysteresis characteristics as is found in such materials as "Deltamax," "Orthonol," etc.

Although the above amplifier represents a marked advance in the art, permitting higher gain, higher speed of operation, and generally better all around amplifier performance than previously obtainable, there are certain shortcomings present therein, and it is these shortcomings which form the basis of the present invention.

With particular reference to the single core version of the above mentioned reset amplifier, there is included a saturable core member, usually a toroid, on which is wound a control winding and a load winding. The load winding is connected in series through a half wave rectifier to the load to be driven; and an alternating voltage, usually of power line frequencies, is connected across the entire series combination. The half wave rectifier acts to permit only the alternate half cycles of the supply voltage to be applied to the load winding and the load. The flow of current to the load is limited to the magnetization current of the core until the core becomes saturated. After saturation and for the rest of the applied load voltage half cycle only the load itself limits the flow of current in the load circuit. To control delivery of power to the load, the magnetization level of the core is periodically reset by the control circuit to some controlled value of magnetization during the half cycles intermediate the half cycle application of load voltage. This action is accomplished by connecting the control winding through a half wave rectifier to an alternating voltage of the same phase and frequency as the load voltage. The latter rectifier is poled to permit application of a control voltage pulsation to the control winding only during the half cycles intermediate the application of the load voltage to the load winding. The load and control windings thus receive half cycle voltage pulsations in alternation. The pulsating voltage applied to the load winding operates to shift the flux level of the core in one direction, toward the upper saturation knee of the hysteresis loop, for example, while the voltage alternately applied to the control winding operates to shift the flux level of the core in the opposite direction.

The core itself must have high remanence, square hysteresis loop properties, and in accordance with the underlying theory of the foregoing amplifier, the unsaturated flux level established in the core at the end of an applied voltage pulsation is dependent upon the volt-second value of the applied voltage pulsation. In practice, the volt-second value of the voltage pulsation applied to the load winding is chosen so that it acting by itself is just sufficient to saturate the core; that is, to drive the core from one "knee," lower for example, of the hysteresis loop to the other "knee" with each pulsation. The volt-second value of the voltage pulsation applied to the control winding is made adjustable between the limits of zero and a value equal to the time-integral of the load voltage pulsation. Thus in operation, when the control voltage volt-second value is adjusted to equal that of the pulsating load voltage, the flux level of the core is periodically shifted back and forth from one "knee" of the hysteresis loop to the other respectively by the alternate application of the load and control voltage pulsations. In this condition only magnetizing current flows in the load circuit and zero output from the amplifier obtains, since essentially the entire load voltage pulsation is absorbed in raising the core from one knee of the hysteresis loop to the other. Adjustment of the time-integral of control voltage pulsation to a value less than that mentioned above means that during the application of the control voltage pulsation, the flux level of the core is reset to some point intermediate the saturation "knees" of the hysteresis loop. Thus during the next application of a load voltage pulsation only a part of such voltage pulsation is needed to raise the flux level of the core back up to a saturation value and the balance of the load voltage pulsation is then delivered to the load circuit. As the control voltage time-integral is reduced, more and more power is delivered to the load until the condition is reached where the control voltage time-integral is zero. In this case and due to the high remanence of the core the flux level of the core remains nearly at saturation level during the control period; consequently most of the load voltage is then delivered to the load. This condition corresponds to the full load condition.

As will hereinafter be explained in more detail, a disadvantage which is present in the foregoing amplifier is that while a rectangular loop core material is desired, even the highest quality material when employed in an operating circuit of the above type has a dynamic hysteresis characteristic which is not perfectly rectangular i. e., it has a ratio of saturation flux to remanent flux greater than unity. The significance of this ratio is that during the load half cycle the core must first be raised from its remanent flux value to its saturation flux value before power can be delivered to the load. Consequently in the condition where full power is to be delivered to the load and where the remanent flux level is less than the saturation flux level the initial part of the load half cycle is lost in raising the core from its remanent flux level to the saturation level. Accordingly, the average full load current output realizable from the amplifier is less than the theoretical limit depending upon the value of the above defined flux ratio.

One of the reasons that the hysteresis characteristic of even the best material is not perfectly rectangular when employed in an operating circuit is that some fortuitous reset takes place due to the leakage resistance, and at higher frequencies the capacitative effect of the load winding rectifier. Under full load conditions this action reduces the average full load current output from the amplifier. To avoid this defect high quality expensive rectifiers must be employed and even then large amounts of fortuitous reset will occur.

In addition to the above mentioned disadvantage of using rectangular loop core material it is further pertinent to note that such material is now only available in cores which exhibit a relatively wide loop characteristic; that is, these cores have relatively large coercive force properties. Such cores permit relatively large values of magnetization current to flow in the control circuit whereby the power gain factor of the amplifier is degraded. Power gain being defined as the ratio of power delivered by the load to the power required by the control circuit.

It is, accordingly, an object of the present invention to overcome the above described defects.

It is another object of the present invention to provide an amplifier of the above type wherein either high or low remanent property cores may be used without a consequent deterioration of the amplifier performance.

It is another object of the present invention to provide an amplifier of the foregoing type utilizing core material of comparatively narrow hysteresis loop characteristics.

It is another object of this invention to provide an amplifier of the foregoing type wherein lighter weight cores may be utilized for a given power output requirement.

It is still another object of the present invention to provide a magnetic amplifier of the foregoing type offering improved high frequency operation over that heretofore obtainable.

It is still another object of the present invention to provide a magnetic amplifier of the foregoing type wherein a minimum of power is delivered to the load during the off condition of the amplifier and a maximum of power is delivered to the load during the full load condition of the amplifier.

Other objects and features of the present invention will become apparent upon a careful consideration of the following detailed description when taken in connection with the accompanying figures.

Figure 1 is a schematic diagram of one embodiment of the invention;

Figures 2 and 3 show alternate forms of hysteresis loop properties usable by the present invention; and Figure 4 is a plot typically illustrating how the load current varies in the output of the circuit of Figure 1 with variation in the control resistance $R_c$.

With reference now to Figure 1, the reference numeral 10 represents a saturable core member, usually a toroid, on which are wound a control winding 11 and a load winding 12. In accordance with the teachings of the present invention the core material 10 may have a relatively wide, square loop hysteresis characteristic as indicated in Figure 2, such as found in "Deltamax" or "Orthonol" for example, or a comparatively narrow, low remanent, hysteretic loop characteristic as shown in Figure 3, such as is found in "Permalloy" or "Supermalloy" for example. Connected in series with the load winding 12 is the load schematically represented here simply as a resistance labeled $R_L$, a half wave rectifier 14, and a pair of voltage supply terminals 15 across which is applied a suitable alternating supply voltage $E_{ac}$ usually of power line frequencies. Connected in series with the control winding 11 is a second unidirectional rectifying element 13, a control element, here shown as a simple variable resistance labeled $R_c$ and a pair of input supply terminals 16, which likewise are energized from voltage supply $E_{ac}$, typically through transformer 17. Although the control element is shown as a simple variable resistance it is within the purview of this invention to include, in lieu thereof, a pulsating unidirectional voltage supply or a steady D. C. voltage. If such a voltage is used it should be variable in amplitude up to a voltage equal to the voltage peak impressed across terminals 16 and it should be connected to oppose conduction in rectifier 13. Alternatively, the control element $R_c$ or its D. C. voltage equivalent may be eliminated and the reset supply voltage appearing across terminals 16 may be directly varied as by use of a variably tapped transformer at 17.

The circuit thus far described and included within the dotted block 18 is the single core version of the aforementioned magnetic amplifier of Ramey. For purposes of the immediate discussion the core 10 will first be assumed to have the square loop properties depicted by the idealized solid line curve in Figure 2. In the diagram the instantaneous polarity of the alternating voltage $E_{ac}$ applied to the control and load winding circuit terminals 16 and 15 respectively, are indicated by the plus, minus signs, these signs being chosen to illustrate the polarity of the voltage $E_{ac}$ during the reset half cycle of the amplifier. The winding polarity of windings 11 and 12 is indicated by the dots shown adjacent one terminal thereof. The dot convention may be taken to indicate that when a voltage is impressed across either of the windings with a given polarity at the dot the same polarity will be induced, before core saturation, at the corresponding terminal of the other winding. Stated otherwise, current entering either winding from the terminal thereof adjacent the dot will induce a flux in core 10 in a first direction, whereas current entering either winding from the opposite terminal will induce a flux in the opposite direction in the core.

The polarity of rectifiers 13 and 14 and the phase of the connections of the supply voltage $E_{ac}$ to the respective input terminals 16 and 15 of these windings are so chosen that conduction through the rectifiers 13 and 14 will take place in succession rather than simultaneously. According to the theory advanced in the above identified references, the operation of the amplifier thus far described is such that the core is magnetized and power is delivered to the load during one half cycle of the applied $E_{ac}$ voltage and the amplifier magnetization level is reset during the next successive half cycle of applied $E_{ac}$ voltage. In operation and considering the condition where no power is to be delivered to the load $R_L$, the control resistance $R_c$ is set to a value much smaller than the reactance of the control winding 11 so that the applied $E_{ac}$ voltage appearing across terminals 16 when conduction is permitted in rectifier 13 will all appear across the winding 11 to demagnetize or reset the core. In this condition and on the assumption that the hysteretic loop is similar to that illustrated by the solid curve in Figure 2, and that the previous history of the core has been such that the flux level therein is initially at the upper remanence point $B_r$, the operation of the amplifier in the no-load condition will be as follows: With the instantaneous polarity of $E_{ac}$ being that indicated in the diagram, rectifier 14 blocks the applied voltage from winding 12 whereas rectifier 13 permits the application of the voltage appearing across its input terminal 16 to the control winding 11. Since resistance $R_c$ is adjusted to a value small compared to the reactance of control winding 11, demagnetizing current will flow in the control circuit, entering winding 11 at the terminal adjacent the dot and passing through rectifier 13 and control resistance $R_c$ back to the supply terminals 16. This flow of current causes the flux level of the core to be driven downward from its remanence value $B_r$ to a point arbitrarily indicated at 8 during the half cycle that rectifier 13 is conducting. At the end of this half cycle the polarity of applied voltages appearing across terminals 15 and 16 reverses whereby current is now permitted to flow through the load $R_L$, rectifier 14 and winding 12 but is blocked by rectifier 13 from winding 11. During this half cycle, current will flow into the terminal of winding 12 opposite the dot, and the magnetization level of the core will be raised from point 8 back up to point $B_r$. When the resistance $R_c$ is small relative to the reactance of winding 11, the volt-second value of voltage impressed on winding 11 will be equal to that available in the load circuit and the flux level of the core will shift from $B_r$ to point 8 and back again with each cycle of applied voltage $E_{ac}$. Substantially all the energy in the load half cycle will be absorbed in raising the core from its reset value 8 back to its remanence value $B_r$ and a minimum of power is delivered to the load. Now if the control resistance $R_c$ is increased in value so that a substantial portion of the voltage appearing across terminals 16 is permitted to be developed across the control resistance Rc then only a portion of the volt-second value of the control voltage appearing across terminals 16 will be impressed on winding 11, in which case the core magnetization level will be reset from point Br downward to some point short of point 8 such as is arbitrarily indicated at 6 as determined by the setting of Rc. Consequently, during the load half cycle the volt-second available in the load circuit exceeds that applied to the control winding 11 whereby the core 10 is driven into saturation during the initial part of the load half cycle and load current is permitted to flow during the remainder of the load half cycle.

The manner in which the output current varies with the adjustment of the control resistance Rc (transfer characteristic) is diagrammatically indicated in an idealized manner by the solid curve 30 shown in Figure 4. Although in practice this characteristic is not a linear function when the control element is a simple variable resistance Rc it has been shown linear for purposes of simplifying the discussion. In the condition where Rc is zero only the magnetization current will be permitted to flow in the output circuit. As resistance Rc is increased more of the reset voltage is developed thereacross and less volt-seconds are applied to the control winding 11 during core reset. Therefore as this resistance is increased, more and more output current is permitted to flow in the load circuit until a maximum is attained at the upper knee of the curve 30. The idealized transfer characteristic depicted by curve 30, Figure 4, is based on the attainment of a perfectly square loop hysteresis characteristic (solid curve of Figure 2) which has a remanence flux value Br substantially equal to the maximum flux obtained in the core 10 during the time full load output current flows. The solid hysteretic loop shown in Figure 2 is, as mentioned, an idealized case and more nearly represents the D. C. hysteresis loop characteristic of core 10. In an actual operating circuit, however, where power line frequencies are employed for Eac or where the frequencies of Eac are of a higher order of magnitude, for example 400 cycles, etc., the squareness of the hysteretic loop shown in Figure 2 deteriorates to something more nearly approaching that indicated in this figure by the dashed curve which might be referred to as the dynamic loop characteristic of even the best so-called square loop cores now presently available. As indicated by this curve the coercive point Hc is widened to a value Hc' and the remanent flux point Br, for reasons later described, drops to some value designated Br'. It is apparent from this deterioration in the squareness of the hysteretic loop that the actual operating remanence flux value Br' is less than the maximum flux which obtains during full load output current flow. This factor causes the full load output current which is actually available to be reduced over that theoretically possible since during the load half cycle the flux level of the core must first be raised from its actual value Br' to its maximum value before saturation current can flow. This action reduces the maximum load current available from a given amplifier in the manner indicated by the dotted curve 31 in Figure 4.

In addition to the foregoing, and when the core is operated at power line frequencies the widening effect of the hysteretic loop as indicated by the differences in coercive points Hc versus Hc' causes greater magnetizing current to flow. This increase in magnetizing current is relatively insignificant as far as the load circuit is concerned, but in the control circuit it is quite an important factor in that it represents an increase in the power input to the amplifier for the same power output.

The above mentioned disadvantage of core reset due to the drop in remanent flux value from the theoretical Br to the actual operating value Br' as indicated causes a sacrifice in the maximum full load current obtainable from a given amplifier. This fortuitous reset is primarily caused by the presence of the leakage resistance R in output rectifier 14. While it must be understood that this leakage resistance is present in the other rectifiers shown in the diagram of Figure 1, it is most detrimental to the operation of the amplifier when the same appears in the output rectifier 14. To best understand how the leakage resistance R of rectifier 14 causes fortuitous reset of the core, take the case where full power is to be delivered to the load and consequently where resistance Rc has been adjusted to a point where no reset is intended to occur by virtue of the control winding 11. In this case the magnetization level of the core theoretically should remain at Br for full load operation. During the reset half cycle when the instantaneous polarities of the applied voltages are as indicated in the diagram conduction is permitted in rectifier 13, but most of the control voltage appearing across terminal 16 is absorbed in the large control resistance Rc and a minimum of voltage is absorbed by the winding 11. This causes a minimum of reset by winding 11, but during this half cycle the voltage appearing across the load input terminals 15 instead of being totally blocked by rectifier 14 is permitted to leak through resistance R and appear across winding 12. This leakage current flows into the dot terminal of winding 12 and thereby resets the core fortuitously to point Br' on the dashed hysteretic characteristic.

At high Eac line frequencies, and/or high load current requirements where the rectifiers have large plate areas, the capacitative effect of rectifier 14 is also noticeable and causes fortuitous core reset in the same way as the leakage resistance R. The operation of the above amplifier is limited, therefore, to relatively low frequencies since its performance which is predicated on the solid line square loop hysteretic curve of Figure 2 deteriorates under relatively high frequency, high current conditions.

I have found that the above defects can be offset, however, by winding a tertiary winding 19 similar to winding 11 around core 10. In circuit connections, winding 19 is included as an element in series with a half wave rectifier 20, a second control resistance Rc' or its D. C. voltage equivalent, and a pair of input terminals 22, which in turn are connected to the supply voltage Eac through a transformer 21, for example. The polarities of the rectifier 20 and the winding 19 in relation to the phase of the applied voltage appearing across terminals 22 is as indicated in the diagram. With this arrangement windings 11 and 19 are simultaneously operative. The polarities of windings 19 and 11 are reversed however, so that current flow through winding 11 tending to reset (demagnetize) the core 10 to some magnetization value below the remanence value Br' may be balanced against the reverse (magnetizing) action produced by the addition of control winding 19. In this way any fortuitous resetting which tends to take place by virtue of the leakage resistance R or capacitive effect of rectifier 14 may be negated by the action of winding 19. More specifically the leakage current which flows through resistance R and which tends to reset the core to Br' in Figure 2 may be counterbalanced by establishing an opposing flux by conduction in rectifier 20. Thus the loss in remanence properties from Br to Br' may be compensated for in this circuit since during the reset half cycle rectifier 20 is in a condition to conduct and resistance Rc' can be adjusted so as to hold the value of flux in core 10 at its saturation value.

In operation, and in the condition when no output is to be delivered to the load RL, Rc is reduced to zero for maximum reset and the auxiliary control resistance Rc' is adjusted to its largest value whereby the effect of this winding will be effectively nullified thus permitting total reset to take place. In the condition where full load is to be delivered, resistance Rc is increased to its maximum value thereby causing a minimum of reset due to control winding 11, and resistance $R_c'$ is reduced in value to a point which compensates for the fortuitous reset due to the leakage current flowing through rectifier 14. It has been found that adding winding 19 to a core 10 of high remanence properties as depicted in Figure 2 makes possible the attainment of a transfer characteristic which is essentially indistinguishable from that indicated by the idealized curve of Figure 4.

Since from the foregoing description it is apparent that the addition of winding 19 and its associated control circuit permits greater output current to be obtained from a given amplifier, it will be equally apparent that the teachings of the present invention permits meeting a given power requirement with lighter weight cores than were heretofore necessary. Such saving, of course, is very favorably reflected in cost and bulk of the end equipment.

In applying the teachings of this invention to the full wave version of the above referenced Ramey amplifier, the addition of the above described auxiliary control circuit increased the available current to the load by as much as 76%.

The addition of winding 19 and its auxiliary control circuit also permits greater freedom in the choice of the rectifiers as well as the materials for core 10 since material such as "Permalloy," "Supermalloy" and etc., exhibiting low remanence properties along the lines depicted in Figure 3 may be employed to the same advantage as the high remanence core materials used by the amplifier referred to hereinabove. In this case and where full load current is desired the automatic reset action due to the low remanence of the core and the fortuitous reset due to the leakage resistance R of rectifier 14 can be compensated for by appropriate adjustment of $R_c'$.

In analyzing the operation of an amplifier constructed according to the teaching of the present invention and wherein low remanent core material is utilized, the state of the core at the end of the control half cycle may be determined as a function of the net volt-seconds which appear across the core windings during this interval and the direction (polarity) of these volt-seconds. In the ideal square loop case, the state of the core will not change by itself since the remanent flux level and the saturating flux level are one and the same. However, as soon as the remanent flux level becomes less than the saturation level either by using low remanent core material having the characteristic depicted in Figure 3 or by the fortuitous reset action due to leakage current flowing through rectifier 14 or both, the core tends to reset itself and the flux level at the end of the control half cycle tends to collapse. Collapsing flux lines generates a back voltage in the windings on the core, specifically winding 19, which is of such a polarity as to cause magnetizing current IM to flow through rectifier 20. The magnetizing current IM, which is fixed by the core and its windings, produces a voltage drop across the control resistance $R_c'$ which in turn establishes the volt-seconds appearing across the winding 19, and thus the state of the core. Specifically, small $R_c'$, small volt-seconds and thus little change in the core state. Large $R_c'$, large volt-seconds and accordingly greater reset of the core. The limit to which the core will reset itself is reached when the resistance $R_c'$ is adjusted to a value which permits the voltage induced in the windings, specifically in load winding 12, by collapsing flux lines to equal the supply voltage appearing across input terminals 15. The supply voltage appearing across terminals 15 opposes the induced voltage in winding 12 during the reset half cycle, but this induced voltage like the voltage induced in winding 19 is of such a polarity as to cause magnetizing current to flow through its associated rectifier. Consequently if $R_c'$ is adjusted to a large value so as to permit the induced voltage to rise to or above the opposing supply terminal voltage appearing across terminals 15, magnetizing current IM will flow in the load winding 12 to prevent further core reset.

From the foregoing it is apparent that with low remanent core material the core tends to reset itself during the control half cycle with the collapsing lines of flux acting to cause magnetizing current to flow through resistance $R'_c$ the value of which determines the volt-second appearing across the terminals of winding 19 and thereby the amount of core reset. As before, for full power output, zero reset, zero volt-seconds should appear across the winding 19. In this phase of amplifier operation then the voltage across terminals 22 comes into play in that it should be of such a direction as to make the net volt-seconds equal to zero so no undesired reset will occur. The terminal 22 voltage thus supplies the current required to cancel the effect of leakage current in rectifier 14 during core reset and/or supply the magnetizing current $IM^2 R_c'$ losses. This condition obtains for both high and low remanence cores at full output.

In conditions where less than full output are desired the desired reset value is achieved through winding 11 alone in cores having good square loop characteristics. When materials with lower remanence are employed however, the reset action is divided between windings 19 and 11, in a ratio determined by the ratio of remanent flux to maximum flux and required output level. Part of the net volt-seconds to be applied to the windings during the control half cycle is supplied by the collapse in flux in the core as controlled by resistance $R'_c$, while part of the reset volt-seconds will be supplied by the voltage appearing across terminals 16 and impressed on winding 11.

From the foregoing it is apparent that no matter what the core material the voltage across terminals 22 for full load output need only be large enough to overcome the reset due to leakage in rectifier 14 and to cancel the magnetizing current losses in control resistance $R'_c$.

From the above description of reset when low remanent cores are used it will be seen that even though such cores may tend to reset themselves to the origin O (Figure 3), due to the natural remanence characteristic of the core itself and to the leakage current of rectifier 14, to obtain full reset action and to take advantage of the lower half of the hysteresis loop, a voltage at terminals 16 should be used to drive the core to the lower knee 34. In this connection the leakage of rectifier 14 may be deliberately increased to promote core reset.

Core material exhibiting the properties depicted in Figure 3 have the distinct advantage in that they have low coercive values Hc relative to the coercive value of square loop cores. The effect of this difference in coercive values not only diminishes the hysteretic loss in the core with frequency but also permits lower values of magnetization current to flow. Lower values of current permit smaller control circuit powers and therefore greater gain in the amplifier can result.

Although I have shown and described only certain specific embodiments of the present invention it must be understood that I am fully aware of the many modifications possible thereof. For instance, while three windings have been illustrated this is not the minimum number required, since the functions of certain of the windings may be combined. As an example it is common practice to replace windings 11 and 12 by a single winding. Therefore this invention is not to be restricted except as indicated by the spirit of the disclosure given herein.

The invention described therein may be manufactured and used by or for the Government of the United States of America for governmental purposes without the payment of any royalties thereon or therefor.

What is claimed is:

1. A half-wave magnetic amplifier comprising; a saturable core constructed to form a single magnetic flux path; first, second and third windings on said core linking said path; a source of alternating current; a load; first, second and third unilateral impedance devices; first and second variable impedance devices; means for saturating the saturable core during first polarity half cycles of the alternating current to deliver power to the load comprising, a series connection of the first winding, the load, and the first unilateral impedance device to the source of alternating current; compensating means for providing additional flux in the same sense as the saturating flux during second polarity half cycles of the alternating current comprising, a series connection of the second winding, the second unilateral impedance element, and the first variable impedance device to the source of alternating current, said means providing compensation for core losses and reverse current flow through the first unilateral impedance device during second polarity half cycles of the alternating current; and means for establishing a selected core flux level below saturation during second polarity half cycles of the alternating current comprising, a series connection of the third winding, the third unilateral impedance device and the second variable impedance device to the source of alternating current.

2. A half-wave magnetic amplifier comprising; a saturable core constructed to form a single magnetic flux path; first, second and third windings on said core linking said path; a source of alternating current; a load; first, second and third unilateral impedance devices; first and second control elements; means for saturating the saturable core during first polarity half cycles of the alternating current to deliver power to the load comprising, a series connection of the first winding; the load, and the first unilateral impedance device to the source of alternating current; compensating means for providing additional flux in the same sense as the saturating flux during second polarity half cycles of the alternating current comprising, a series connection of the second winding, the second unilateral impedance element, and the first control element to the source of alternating current, said means providing compensation for core losses and reverse current flow through the first unilateral impedance device during second polarity half cycles of the alternating current, and means for establishing a selected core flux level below saturation during second polarity half cycles of the alternating current comprising, a series connection of the third winding, the third unilateral impedance device and the second control element to the source of alternating current.

References Cited in the file of this patent

UNITED STATES PATENTS

| | | |
|---|---|---|
| 2,126,790 | Logan | Aug. 16, 1938 |
| 2,259,647 | Logan | Oct. 21, 1941 |
| 2,388,070 | Middel | Oct. 30, 1945 |
| 2,554,203 | Morgan | May 22, 1951 |
| 2,573,818 | Votruba | Nov. 6, 1951 |
| 2,640,098 | Grillo | May 26, 1953 |
| 2,657,281 | Kluz | Oct. 27, 1953 |
| 2,682,632 | Cohen et al. | June 29, 1954 |

OTHER REFERENCES

AIEE Technical Paper 51–389, November 1, 1951, "On the Control of Magnetic Amplifiers," by Ramey, 9 pages —1 sheet dwg.